ced cited by examiner

(12) United States Patent
Menezes et al.

(10) Patent No.: US 10,303,797 B1
(45) Date of Patent: May 28, 2019

(54) CLUSTERING FILES IN DEDUPLICATION SYSTEMS

(71) Applicant: EMC Corporation, Hopkinton, MA (US)

(72) Inventors: Guilherme Menezes, Santa Clara, CA (US); Abdullah Reza, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 447 days.

(21) Appl. No.: 14/974,989

(22) Filed: Dec. 18, 2015

(51) Int. Cl.
*G06F 7/00* (2006.01)
*G06F 17/30* (2006.01)

(52) U.S. Cl.
CPC .. *G06F 17/30598* (2013.01); *G06F 17/30097* (2013.01); *G06F 17/30156* (2013.01)

(58) Field of Classification Search
CPC ................................................ G06F 17/30324
USPC ........................................................ 707/745
See application file for complete search history.

(56) References Cited

U.S. PATENT DOCUMENTS

| | | | | |
|---|---|---|---|---|
| 7,634,127 B1 * | 12/2009 | Sundararajan | ........ | G06T 11/206 382/145 |
| 7,685,171 B1 * | 3/2010 | Beaverson | .......... | G06F 11/1451 707/999.202 |
| 7,725,704 B1 * | 5/2010 | Beaverson | ............ | G06F 9/4401 713/1 |
| 8,082,231 B1 * | 12/2011 | McDaniel | ........... | G06F 11/1453 707/681 |
| 8,612,696 B2 * | 12/2013 | Zhu | ........................ | G06F 3/0608 711/100 |
| 8,635,184 B2 * | 1/2014 | Hsu | .................... | G06F 17/30156 707/609 |
| 9,159,115 B1 * | 10/2015 | Collins | ...................... | G06T 3/20 |
| 9,594,674 B1 * | 3/2017 | Mondal | ............... | G06F 12/0269 |
| 9,678,863 B2 * | 6/2017 | Talagala | .............. | G06F 12/0246 |
| 9,715,505 B1 * | 7/2017 | Mondal | ............... | G06F 17/30138 |
| 2012/0254192 A1 * | 10/2012 | Gelbard | ............ | G06F 17/30324 707/745 |
| 2013/0275365 A1 * | 10/2013 | Wang | ................. | G06F 17/30592 707/602 |
| 2014/0244691 A1 * | 8/2014 | Reddy | ............... | G06F 17/30312 707/790 |
| 2015/0026141 A1 * | 1/2015 | Blanco | .............. | G06F 17/30315 707/693 |

FOREIGN PATENT DOCUMENTS

WO  WO-2008008183 A2  1/2008
WO  WO-2008008183 A3  10/2008

* cited by examiner

*Primary Examiner* — Eliyah S. Harper
(74) *Attorney, Agent, or Firm* — Womble Bond Dickinson (US) LLP

(57) ABSTRACT

Clustering files in deduplication systems is based on an estimate of similarity between files in a file system. The estimates of similarity are based on how much content the files share, where the estimate of how much content is shared is based on an estimate of segments shared. The estimate of segments shared is based on segment offsets found in the files' bitmap vectors of segment offsets. The found segment offsets are used to generate a cluster definition approximating an optimal data structure for clustering files that share content. The approximated optimal data structure defines clusters hierarchically arranged based on the offset numbers of the found segment offsets.

24 Claims, 9 Drawing Sheets

CLUSTERING FILES IN DEDUPLICATION SYSTEMS

FIELD OF THE INVENTION

Embodiments of the present invention relate generally to data storage systems. More particularly, embodiments of the invention relate to storing files using clustering for data storage systems using deduplication.

BACKGROUND

In data storage systems the ability to store large amounts of data as efficiently as possible is of paramount importance. One approach to storing data efficiently is to store files in clusters.

In deduplication file systems a file may be split into hundreds of millions of segments during the write process. A segment that has already been stored during an earlier write process is not re-written, but rather recorded in the file's offsets in order to optimize storage capacity utilization. Thus, in the context of deduplication storage systems, a cluster can be used to store segments of data to minimize the amount of searching and indexing required to retrieve a segment. Conversely, once files are stored on a deduplication storage system, it would be beneficial to identify clusters based on their similarity and relocate clusters with similar content to different deduplication systems to achieve the same effect.

Being able to identify clusters of files based on their similarity is useful for a number of other reasons as well. For example, files having segments that compress/deduplicate well can be co-located in the same compression/deduplication domains/partitions, or moved together to different compression/deduplication domains/partitions or to different machines/nodes in a cluster of machines/appliances. Conversely, files having segments that do not compress/deduplicate well can be moved to less expensive storage systems that do not use deduplication.

One of the challenges in using clusters to store files or to identify clusters of files already stored in a file system with data deduplication is to identify a hierarchy of clusters that will best serve the needs of the storage system. The hierarchy of clusters can be represented as a dendrogram, or tree-structure, in which each cluster ideally contains files that share a significantly large amount of content, and in which each successive level of the dendrogram represents increasing levels of granularity in the amount of content that is shared.

An optimum dendrogram is defined as one that maximizes the cohesion of the files stored in a given cluster, i.e., one in which the similarity of the files is great and the differences small. But for file systems that store millions of files, generating the optimum dendrogram is computationally intensive and difficult to implement.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
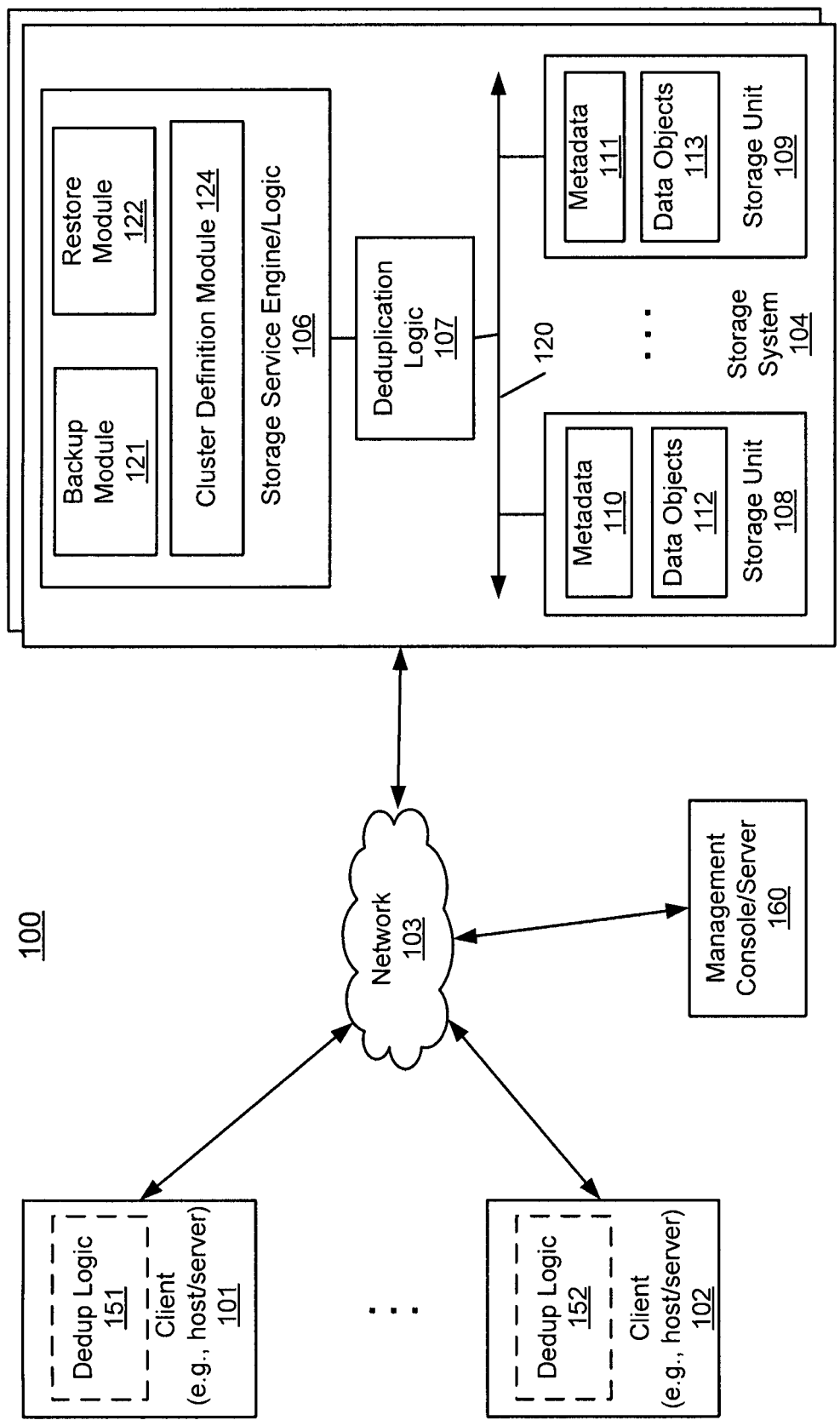
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Storing files in clusters defined by an optimal dendrogram facilitates optimizing the capacity of a file system. However, generating the optimal dendrogram structure is a quadratic problem in nature, requiring the calculation of the similarity of any two files Fi and Fj for all possible $1 \leq i, j \leq N$ for the files $\{F1, F2, \ldots, FN\}$ in the system. For this reason generating the optimal dendrogram is impractical for a deduplication file system that contains millions of files composed of billions of segments.

According to some embodiments, a cluster definition process overcomes the challenges of generating the optimal dendrogram structure for defining a cluster of files stored using deduplication. In one embodiment, the cluster definition process estimates the similarities of N files $\{F1, F2, \ldots, FN\}$ based on comparing the sets of unique segments belonging to the files, and then generates an approximated optimal dendrogram, i.e. a cluster definition, based on the estimated similarities.

In one embodiment, in preparation for estimating the similarities of N files, the cluster definition process generates bitmaps $B_F$ that represent in memory the set of unique segments belonging to each of the N files $\{F1, F2, \ldots, FN\}$ as a set of bits having a binary value of zero or one. In one embodiment, each individual bitmap $B_F$ is stored in memory in a bitmap vector B containing a set S of bits having binary values of either one or zero. For purposes of estimating the similarity of files, each bit position in the set of bits represents an offset to a particular unique segment s that belongs to the file F when the bit value is one and does not belong to the file when the bit value is zero.

In one embodiment, bitmap $B_F$ is stored as a bloom filter with a single hash function that uniformly distributes the set S of ones and zeroes across the bitmap vector B. The bitmap vector B is initially a set of all zeroes. A unique segment s belonging to the file F is mapped to a particular bit location, i.e., the offset, in the bitmap vector B using an algorithm to insert(s, S) using the bloom filter with the single hash function and bitmap B:

function insert(segment $s$)

$B[\text{hash}(s)]=1$

The bit value at the B[hash(s)] location in the bitmap vector B is flipped from zero to one in order to represent that an element was added to the set S of ones and zeroes, i.e. that the unique segment s is mapped to that bit's offset in bitmap vector B and, therefore, belongs to file F.

Bloom filters allow a small number of false positive lookups to occur. In other words a lookup function, lookup (s1, S), might return "true" even if the segment s1 was never inserted into S. For example, if another segment s2 was also inserted into S such that there is a hash function conflict, i.e., hash(s1)=hash(s2), then there can be a false lookup for s1. For the purpose of estimating file similarity, however, it is not necessary to use a lookup function because there is no need to find exactly which unique segments belong to file F, but rather only whether some the segments belonging to one file are similar to those belonging to other files.

For this reason the probability of a false positive lookup need not be low as long as the probability can be analytically estimated with high confidence. A high level of confidence can be achieved when the hash function hash(s) uniformly distributes the ones and zeroes across the entire bitmap B. In this manner, storing bitmap $B_F$ as a bloom filter with a uniform distribution of the set of ones and zeroes advantageously facilitates estimating the similarity in the segments belonging to one file as compared to other files in N files F1, . . . , FN, i.e. which segment offsets the files share in common.

In one embodiment, because the bitmap $B_F$ is used only to estimate the extent of similarity between files having some segments in common (as opposed to determining exactly which segments the files have in common), the bloom filter size M of the bitmap B can be set to a small enough value for compact representation of bitmap $B_F$ in memory (or on disk) while retaining a high load factor in terms of how many unique segments can be represented in any bitmap B relative to M. In this manner, storing the bitmap $B_F$ in memory requires only a small number of bits per segment without significantly compromising the accuracy of estimating the similarity of N files F1, . . . , FN In one embodiment, the bitmaps $B_{F1}$, . . . $B_{FN}$ form the basis of estimates of an extent of similarity between any two or more of the N files {F1, F2, . . . , FN} in a file system with data deduplication and segmentation. The estimates of the extent of similarity are larger when bitmaps $B_F$ share a greater number of the same offsets set to one and smaller when they share less.

If the bitmaps $B_{F1}$, . . . $B_{FN}$ represented every unique segment in file F1, . . . , FN, then it would, in theory, be possible to determine with a high degree of accuracy how many segments are shared across files, and thus generate an optimal cluster definition. For example, given two files F1 and F2, their similarity can be expressed by calculating the Jaccard's Coefficient of the sets of segments represented in the set of bits in $B_{F1}$ and $B_{F2}$ as follows:

$$\text{sim}(F1,F2)=|B_{F1}\cap B_{F2}|\div|B_{F1}\cup B_{F2}|$$

However, as already noted, file systems can store millions of files, and, in the context of deduplication, a file F may refer to many billion segments. It is not possible to represent all of the segments in memory even if the segments are represented using a very compact fingerprint. To overcome this challenge, in one embodiment, the bitmap $B_F$ represents the segments using a probabilistic data structure.

For example, the bitmap $B_F$ can be generated using content-based sampling to reduce the representation space. In one embodiment, sampling is based on a rate 1/R to sample only one segment in each R segments of file F. In one embodiment, sampling is based on a sampling pattern (e.g. a given fingerprint matching pattern) applied to a content of the sampled segments (as opposed to random sampling). For instance, to sample 25% of the segments in the system, only segment fingerprints in which the last two bits of the segment fingerprint have a zero value could be selected for insertion into bitmap $B_F$ in accordance with a content-based fingerprint-sampling pattern. In this manner sampling ensures that a fair representation is obtained of the number of unique segments belonging to file F regardless of the frequency with which any particular segment occurs so as not to significantly compromise the accuracy of bitmap $B_F$ for estimating similarity of files F.

In one embodiment, in order to further reduce the computational complexity of estimating the similarity of the files, rather than attempting to compute the Jaccard's Coefficient of the sets of segments represented in bitmaps $B_F$, the cluster definition process generates a list of the K smallest offsets $[O_1, O_2, \ldots, O_K]$ in each bitmap $B_F$. Each of the K smallest offsets represents a bit in the most significant (e.g. leftmost) K bits in the set of bits that has a value of one, $B_F[O_j]=1$ for $1 \leq j \leq K$. Those offsets in bitmap $B_F$ having a value of one each represent a particular unique segment that belongs to the file F.

In one embodiment, each of the K smallest offsets $[O_1, O_2, \ldots, O_K]$ in each bitmap $B_F$ are used to generate a list of K offset numbers for each file of files F1, . . . , FN. The K offset numbers are used to cluster files listing a same offset number into a same cluster in a K-level hierarchy of clusters. The result is a hierarchy of clusters of files with K levels of hierarchy and C cluster nodes $[C_0, C_1, \ldots, C_C]$. All other offsets $[O_{K+1}, O_{K+2}, \ldots, O_M]$ for each bitmap $B_F$, where M is the global size of the entire bitmap $B_F$, are not used in estimating the similarity of the files. In this manner, the complexity of estimating the similarity of the files F1, . . . , FN is greatly reduced while still generating an approximated optimal cluster definition that provides sufficient granularity in the clustering to meet the needs of the storage system. More granularity can be achieved with an increase in the value of K, albeit with a corresponding increase in computational complexity.

In one embodiment, a cluster definition process receives various input parameters to optimize the storage requirements associated with estimating similarity and approximating an optimum cluster definition while maintaining processing efficiency. For example, the various parameters can include a value for K for the K smallest offsets to use for estimating similarity, a global size M for generating the bitmaps $B_F$, a sampling rate R for sampling the unique segments in a file F during generation of the bitmaps $B_F$, and a content-based sampling pattern.

In one embodiment, the cluster definition processes, including the similarity estimation processes, are performed for a pre-selected subset of N files {F1, F2, . . . FN}, where the subset of N files is any ad hoc collection of files F associated with a particular client, tenant, application and the like.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other.

Storage service engine 106 may represent any storage service related components configured or adapted to provide storage services (e.g., storage as a service) to a variety of clients using any of the access protocols set forth above. For example, storage service engine 106 may include backup logic 121, restore logic 122 and the cluster definition logic 124.

In one embodiment, backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into data objects 112/113 in the form of multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files 112/113 are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In response to a data file to be stored in storage units 108-109, according to one embodiment, a cluster definition module/logic 124 is configured to generate the bitmaps $B_F$ in preparation for generating a cluster definition. The bitmaps $B_F$ are generated either on demand or at the time of writing any N files F1, . . . , FN that are subject to deduplication.

In one embodiment, the cluster definition module/logic 124 is further configured to estimate the similarity in the content of any subset of files based on the bitmaps $B_F$ of the files and various input parameters, such the K smallest offsets to include when estimating the similarity of files. The similarity estimate is used to generate an approximated optimum cluster definition for storage services. Additional details of the cluster definition module/logic are described with reference to FIGS. 2-6.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). An administrator of management console or server 160 may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
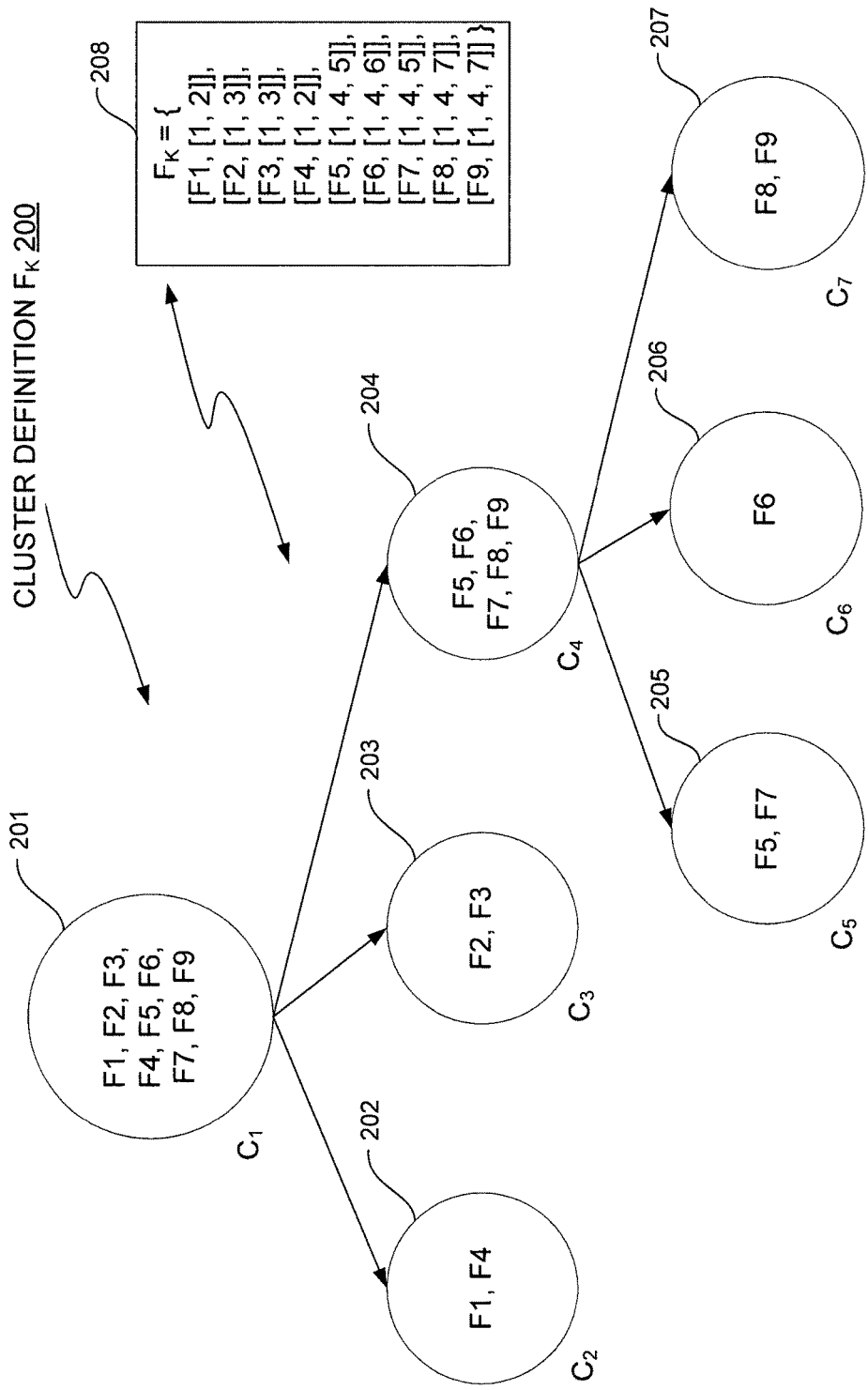
FIG. 2 is a block diagram illustrating an exemplary cluster definition for clustering files in a storage system according to one embodiment of the invention.

FIG. 2 is a block diagram illustrating an example of a cluster 200 of files that can be approximated using the cluster definition module/logic 124 of FIG. 1. More specifically, cluster 200 of files is an example of a dendrogram for a file system with files {F1, F2, . . . , F9} having a super node C1 201 for all files [F1, F2, . . . F9] and cluster node C2 202 containing files F1, F4, cluster node C3 203 containing files F2, F3, cluster node C4 204 containing files F5, F6, F7, F8 and F9. At the next level of granularity is cluster node C5 205 containing files F5, F7, cluster node C6 206 containing file F6, and cluster node C7 207 containing files F8, F9.

In the illustrated embodiment, the cluster 200 is generated from the complete cluster definition $F_K$ 208 containing a set of lists of offset locations for the two (K=2) smallest offset locations contained in the bitmaps $B_F$ (not shown) for files F1, . . . F9. In this example, F1 and F4 share significantly more content than F1 and F2 because they each share the unique segment located at offset $O_2$ whereas F1 and F2 only share the super node category (which, in this example, is not representing that the files are similar other than to represent that all of the files in the super node are one of nine files F1, . . . F9 for which the cluster 200 of files is generated).

Figure 3:
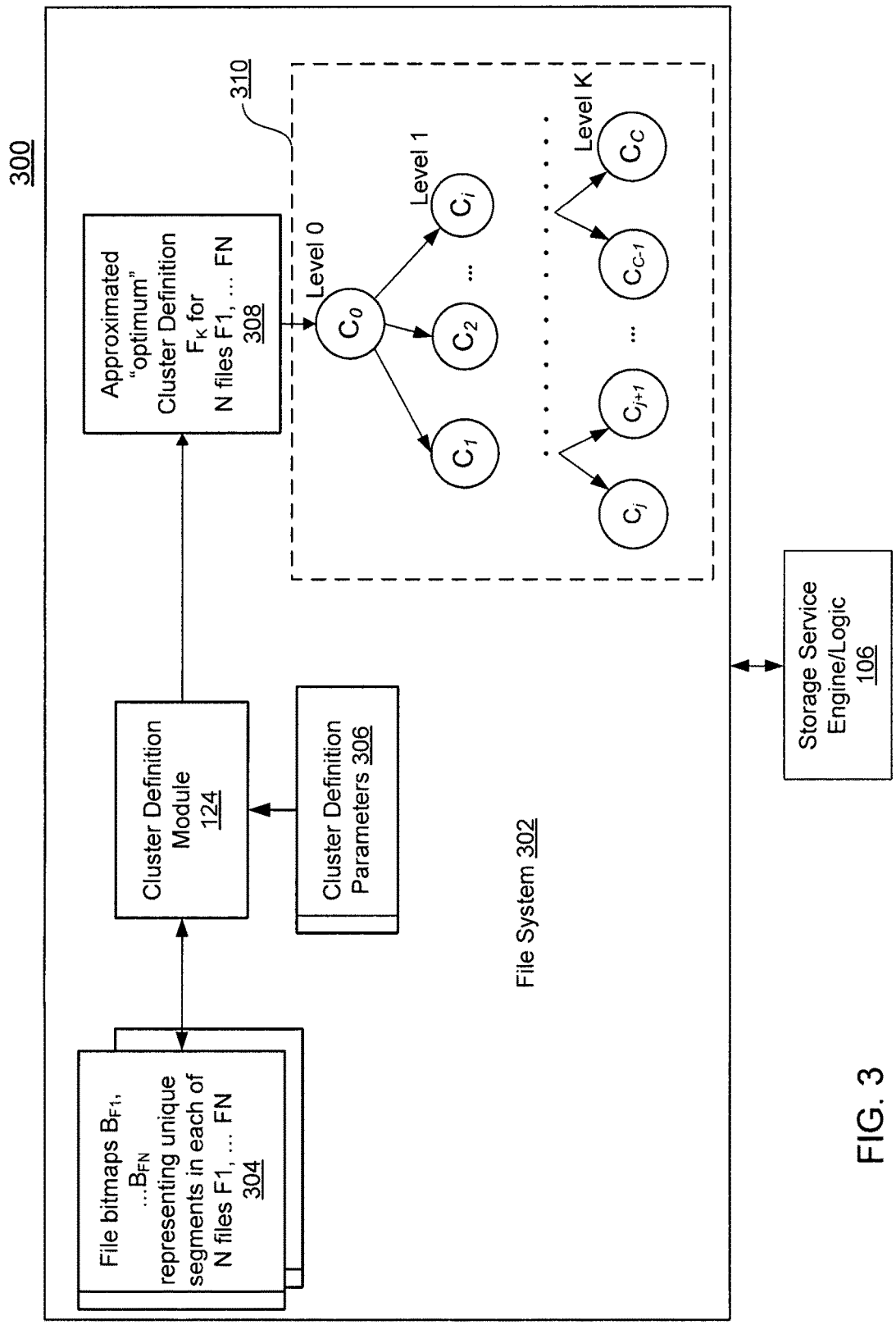
FIG. 3 is a block diagram illustrating a file system for clustering files in a storage system according to one embodiment of the invention.

FIG. 3 is a block diagram illustrating a file system 302 for clustering files in a storage system 300 according to one embodiment of the invention. In one embodiment, the cluster definition module/logic 124 includes processes by which the file system 300 generates, for each file F in a subset of N files F1, F2, . . . FN, bitmaps $B_{F1}$, . . . $B_{FN}$ 304 in persistent storage, either on disk or in memory. Each bitmap $B_F$ represents the unique segments that belong to file F. The bitmaps $B_F$ are generated on demand or when the file is initially written to the file system 302. The bitmaps $B_F$ need be regenerated only if the file is changed. The subset of N files F1, F2, . . . FN can be any ad hoc set of N files, such as those for a particular client or associated with a tenant ID and the like. Additional details of the portion of logic 124 that generates the bitmaps $B_F$ are described with reference to FIG. 5.

In one embodiment, the cluster definition module/logic 124 also includes processes by which the file system estimates the similarity of files F in a subset of N files {F1, F2, . . . , FN}. In view of the complexity of determining the similarity of files (due to the magnitude of the amount of data stored in the storage system), the similarity is instead estimated based on the previously stored bitmaps $B_{F1}$, . . . $B_{FN}$ 304 for the subset of N files {F1, F2, . . . , FN}.

In a typical embodiment, the stored bitmaps $B_F$ 304 are fetched from persistent storage or, if needed, are newly generated for any files F for which a corresponding bitmap $B_F$ has not yet been generated. The logic 124 uses the estimates of the similarity of files F to define in cluster definition $F_K$ 308 an approximated "optimum" hierarchy of clusters (dendrogram) 310, identified with cluster numbers $C_0, C_1, C_2, \ldots C_i, \ldots, C_j, C_{j+1}, \ldots, C_{C-1}, C_C$ distributed into K levels of hierarchy, level 0 through level K, for efficiently storing those files that are similar. Additional details of the portion of logic 124 that defines the approximated "optimum" hierarchy of clusters and efficiently stores the files in the appropriate clusters 310 are described with reference to FIG. 4 and FIG. 6.

In one embodiment, the cluster definition module/logic 124 receives as input various parameters 306 that control how logic 124 is implemented. For example, the processes for generating the bitmaps $B_F$ 304 can receive a sampling rate R and/or sampling pattern for reducing the number of segments selected for insertion into the bloom filter when generating bitmap $B_F$. In another example, the processes for generating the bitmaps $B_F$ 304 receive global bitmap size M which defines a uniform size for the bitmaps $B_F$, and the processes for estimating the similarity of files receive a value for the K minimum number of offsets in bitmaps $B_F$ upon which to base the similarity estimates. The cluster definition module/logic 124 input parameters 306 are summarized in Table 1.

TABLE 1

| | |
|---|---|
| 1. | A set of N files {F1, F2, . . . , FN}. |
| 2. | A minimum number of K offsets in bitmaps $B_F$ for estimating the similarity between files in the set of N files, where larger values for K yield cluster definitions having a greater degree of granularity and vice versa. |
| 3. | The sampling rate R for traversing the unique segments during bitmap $B_F$ generation. |
| 4. | The global bitmap size M for generating the bitmaps $B_F$ |

Figure 4:
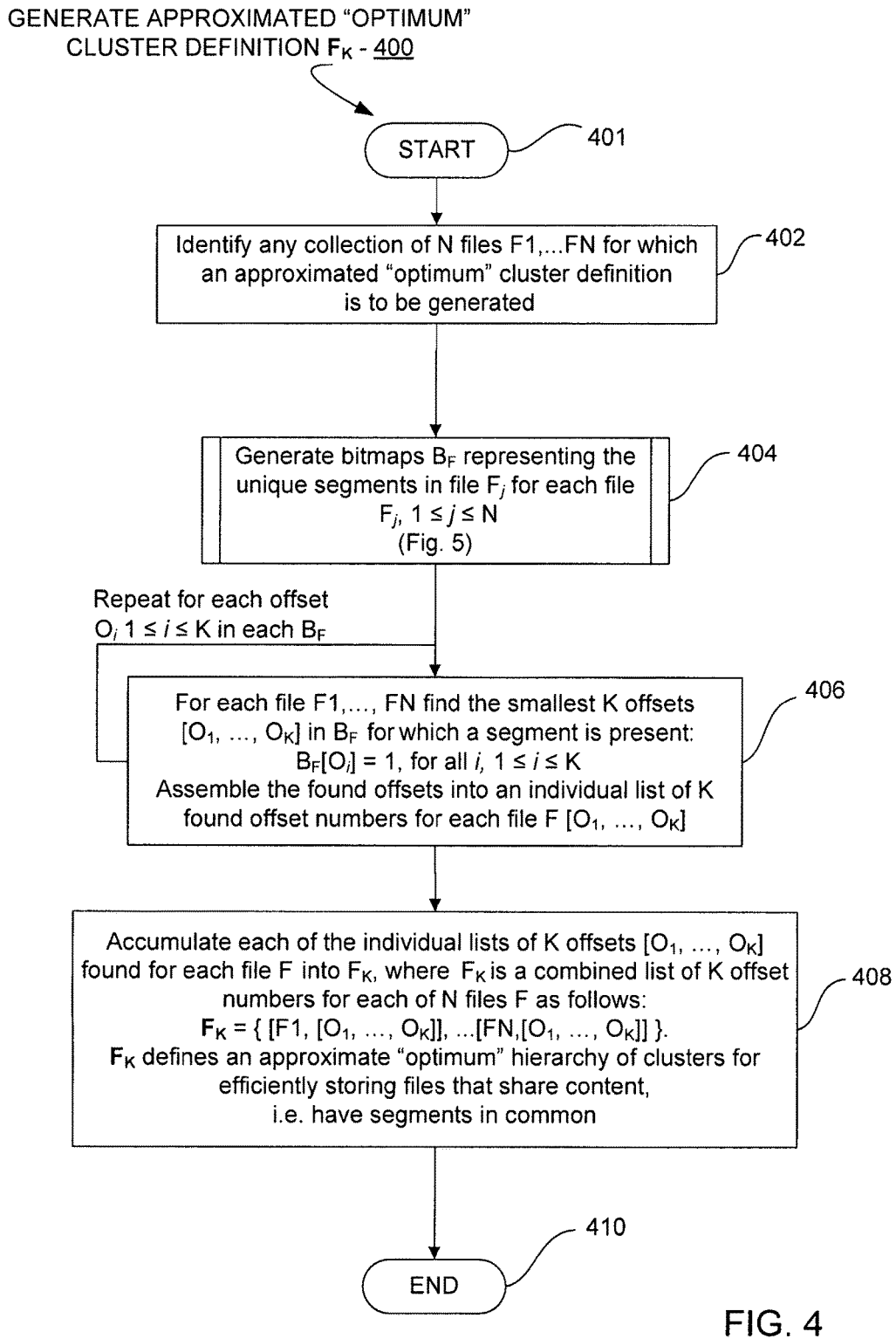
FIG. 4 is a flow diagram illustrating processes for clustering files in a storage system according to one embodiment of the invention.
Figure 5:
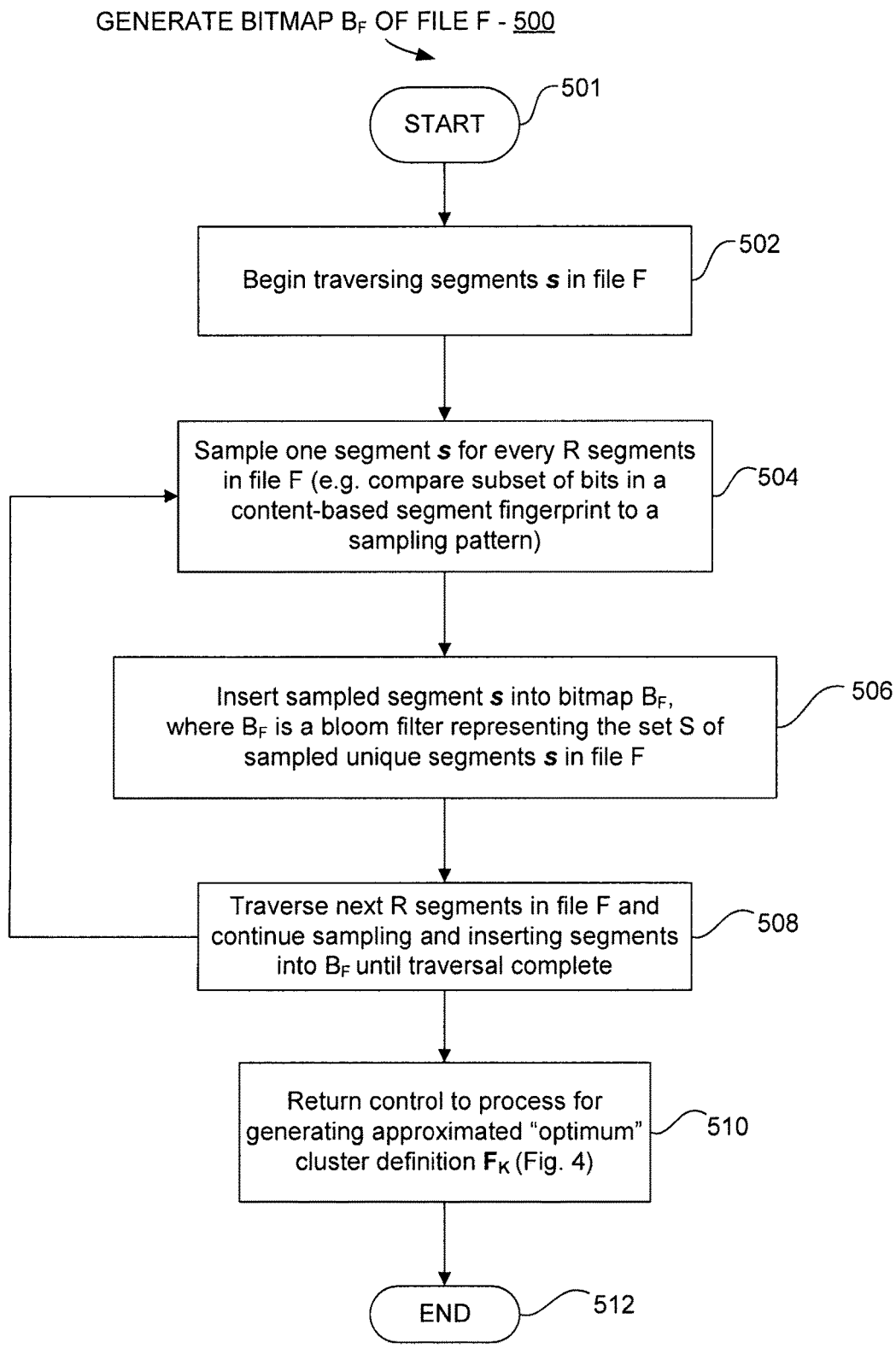
FIG. 5 is a flow diagram illustrating processes for clustering files in a storage system according to one embodiment of the invention.
Figure 6:
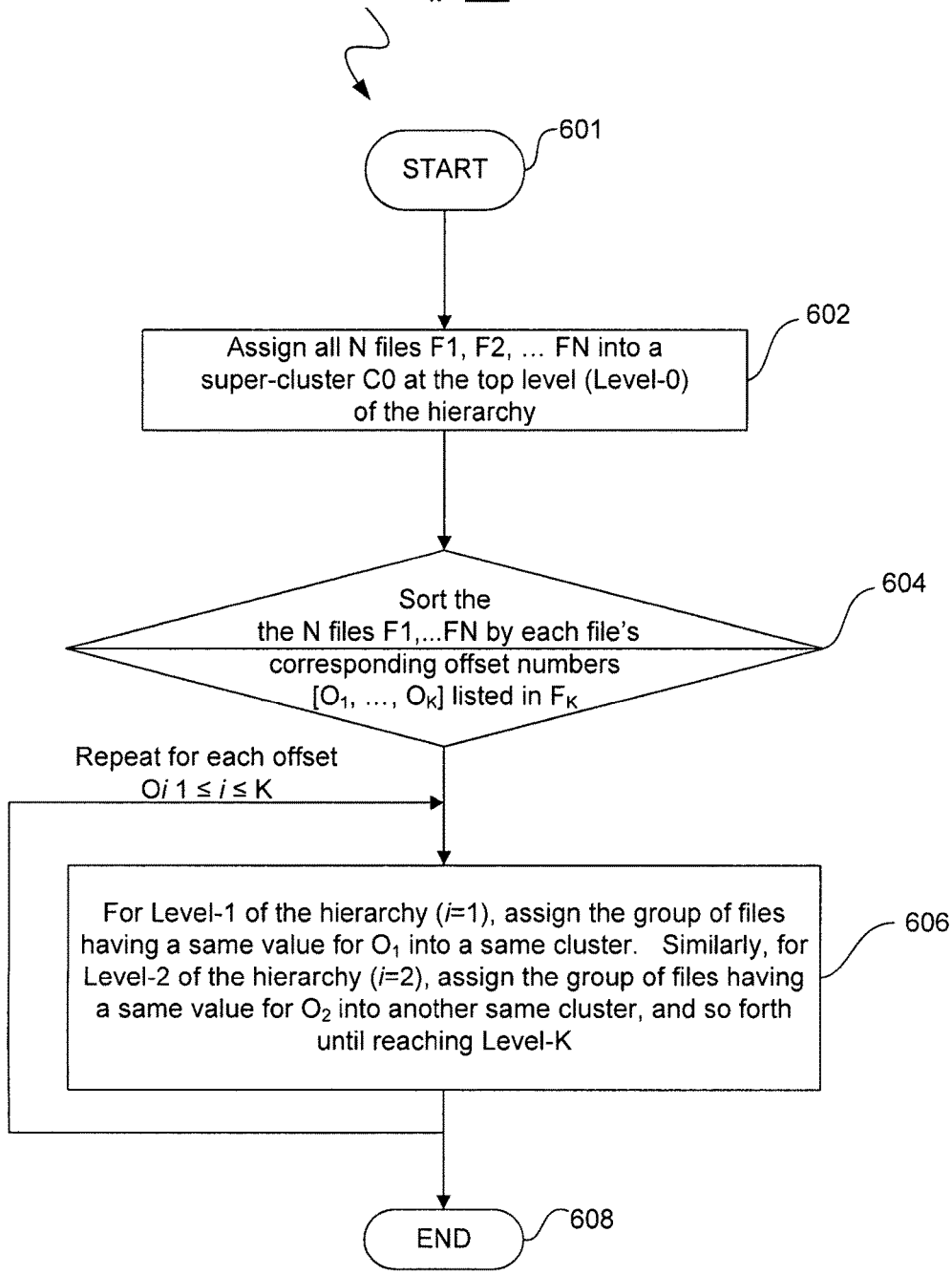
FIG. 6 is a flow diagram illustrating processes for clustering files in a storage system according to one embodiment of the invention.

FIGS. 4-6 are flow diagrams illustrating processes 400, 500 and 600 for generating approximated "optimum" clusters for efficiently storing files F1, . . . , FN according to one embodiment of the invention. Processes 300/400/600 may be performed by processing logic that includes hardware (e.g. circuitry, dedicated logic, etc.), software (e.g., embodied on a non-transitory computer readable medium), or a combination thereof. For example, cluster definition module 124, as illustrated in FIGS. 1 and 3, can perform processes 400/500/600.

With reference to FIG. 4, process 400 for generating an approximated "optimum" cluster definition (308, FIG. 3) begins at 402 to identify any collection of N files F1, . . . FN in the storage system for which an approximated "optimum" cluster definition is to be generated. The identification can be based on an input parameter that specifies which subset of N files are to be measured in preparation for change rate estimation. In one embodiment, the specified N files could be files for a particular client or tenant of the storage system and/or files that are to be co-located in the same compression/deduplication domains/partitions, or moved together to different compression/deduplication domains/partitions or to different machines/nodes in a cluster of machines/appliances.

In one embodiment, the process 400 continues at 404 to generate the bitmaps $B_F$ representing the unique segments belonging to each of the files F1, ... FN (as described in further detail with reference to FIG. 5). Note that bitmap $B_F$ for a file F may have already been computed and stored on persistent storage. If so, the process 404 fetches $B_F$ from persistent storage instead of having to generate it again Once the bitmaps $B_F$ are fetched or generated, the process 400 continues at 406 to find, for each file F1, ... , FN, the smallest K offsets $[O_1, \ldots, O_K]$ in $B_F$ for which a segment is present, i.e. a segment that belongs to file F:

$$B_F[O_i]=1, \text{ for all } i, 1 \leq i \leq K$$

Once the offsets have been found, the process 400 assembles the found offsets into an individual list of K found offset numbers $[O_1, \ldots, O_K]$ for each file F1, ... , FN:

$$F[O_1, \ldots, O_K], \text{ for each of N files } F, F1, \ldots, FN$$

In one embodiment, once the individual lists of found offset numbers have been generated for each of the files F1, ... , FN, the process continues at 408 to accumulate each of the individual lists of K offsets $[O_1, \ldots, O_K]$ found for each file F into $F_K$, where $F_K$ is a combined list of K offset numbers for each of N files F as follows:

$$F_K = \{[F1, [O_1, \ldots, O_K]_{F1}], \ldots [FN, [O_1, \ldots, O_K]_{FN}]\}$$

In one embodiment, $F_K$ defines an approximate "optimum" hierarchy of clusters (308, FIG. 3) for efficiently storing files that share content, i.e. have segments in common. In this manner, the process 400 enables the file system 302 to generate the cluster data structures, or nodes for clusters having K levels of hierarchy and C cluster nodes $C_0$, $C_1$, $C_2$, ... $C_C$, (310, FIG. 3). Using the offset numbers contained in offsets $O_1, \ldots, O_K$, the process 400 further enables the file system 302 to cluster files that share content by clustering files listing the same offset number.

With reference to FIG. 5, because approximated "optimum" clusters for efficiently storing files F1, ... , FN requires estimating an extent of similarity of the files based on comparing the unique segments written for files F1, ... , FN, process 400 represents each file F in memory as a set of segments S such that $$S=\{s|s \text{ is a segment of file } F\} \quad \text{EQ. 1}$$

where the segment s refers to a fingerprint of the content of a unique segment s that belongs to file F and is stored once in a file system with deduplication. It should be noted that throughout this description references to segment s or to a unique segment refer to a fingerprint of the content of a segment and not to the actual segment stored in the file system unless otherwise specified.

Representing F in memory as a set S of unique segments s is a mechanism by which the similarity of one file F can be compared to all other N files F because each of the elements in the set S can be evaluated in order to determine a unique segment s belonging to file F also belongs to any one or more of the other N files F. In actuality, not all of the unique segments s in file F are represented since the storage required to represent all unique segments for every file for which similarity to other files is needed would be too large. Instead, the unique segments selected for inclusion into the set are representative of the number of unique segments belonging to a file F, and the offsets of the bit positions in the resulting bitmap $B_F$ can be used to estimate the similarity of one bitmap $B_F$ to another, and thus the similarity of one file F to another.

In one embodiment, an efficient data structure for compactly representing in memory a set S of segments s is a bloom filter, referred to as a bitmap B, such that inserting a segment s into the bloom filter results in a corresponding bitmap element bit value of "1."

With reference to FIG. 5, in one embodiment, process 500 compresses the bitmap $B_F$ efficiently by using a sparse representation. For example, instead of representing the bitmap $B_F$ as a sequence of bits 1s and 0s, if the number of 1s is very low compared to the number of 0s, then the 1s bits can be represented as a series of offsets inside the bitmap $B_F$. For example, if only bit offset 2 and bit offset 3 are set to 1 in a bitmap $B_F$ of size 4, the bitmap $B_F$ is represented compactly as a sequence [2,3] instead of [0,1,1,0].

In one embodiment, the process 500 increases the compression of the bitmap $B_F$ by applying a form of encoding to the bitmap $B_F$, such as delta encoding, in which case the offset of each is bit in the bitmap $B_F$ is represented using differences. For example, [2,4] can be represented as [2,2], since 4=2+2. Other compression techniques that the process 300 can employ include any kind of lossless data compressor such as those from the Lempel-Ziv family of compressors.

An advantage of using process 500 to generate a bitmap $B_F$ for file F is that the actual amount of data required to store the bitmap $B_F$ is proportional to the number of sampled segments in the file F. Thus, smaller files will be measured with a bitmap $B_F$ that requires a smaller number of sampled segments and thus a very small amount of storage, while bigger files will be measured with a bitmap $B_F$ requiring a greater number of sampled segments and thus a larger amount of storage.

In one embodiment, the process 500 for generating the bitmap $B_F$ for file F begins at 502 with commencing traversing all segments s belonging to file F. In one embodiment, the traversal of the segments in file F is performed at 504 through 508 using a sampling technique until traversal is complete. For example, in one embodiment, at 504 the process 500 samples one segments s for every R unique segments in file F.

In one embodiment, to insure proper sampling, process 500 uses a content-based sampling technique instead of sampling randomly (such as when using rand( ) function). A content-based sampling technique selects the segment for insertion into bitmap $B_F$ only if the segment fingerprint matches a particular content-based fingerprint-sampling pattern.

In this manner, the process 500 consistently samples segments without being affected by the frequency with which the segment belongs to files in the storage system. For example, if segment s1 belongs to files F1, ... FN with a higher frequency than segment s2, content-based sampling avoids the possibility that segment s1 is sampled more often than segment s2.

In one embodiment, after a segment of file F is sampled, at 506 the process 500 inserts the sampled segment into bitmap $B_F$ using a corresponding bloom filter insertion hash function. The process 500 continues at 508 repeating traversing and sampling until traversal is complete. The process 500 can be performed at either the time the file F is written (or overwritten/changed) to the storage system or on demand, i.e. when the extent of similarity between the file F and N other files F1, . . . , FN needs to be estimated (process 400, FIG. 4).

FIG. 6 is a flow diagram illustrating certain aspects of a process 600 for generating the approximated "optimum" cluster nodes for efficiently storing file F once the cluster definition $F_K$ has been computed according to one embodiment of the invention.

In one embodiment, the process 600 begins by assigning 602 all N files F1, F2, . . . FN into a super-cluster C0 at the top level (level-0) of the hierarchy. The process 600 continues sorting 604 the individual lists of K found offset numbers $[O_1, \ldots, O_K]$ accumulated in $F_K$ for each of the N files F1, . . . , FN such that $O_1$ is the most significant number and $O_K$ is the least significant number. In this manner, similar files belonging to the same cluster based on their offsets should be co-located sequentially in the sorted file list.

Once the file lists are sorted, the process 600 continues at 606 to assign each group of similar files F into clusters. Based on the lists of found offset numbers $[O_1, O_2, \ldots, O_K]$ for the files, the process 600 generates a cluster hierarchy with K levels. For level-1 of the cluster hierarchy, the process 600 assigns each group of files having the same value for $O_1$ into the same cluster. Likewise, for level-2 of the hierarchy, the process 600 assigns each group of files having same value for $O_2$ into another cluster. The process 600 continues assigning groups of files having the same value for found offset number $O_K$ into a same cluster for each level of hierarchy until reaching level K.

In one embodiment, the approximate cluster definition $F_K$ used to generate the clusters may be updated periodically at predetermined intervals or on demand.

Figure 7:
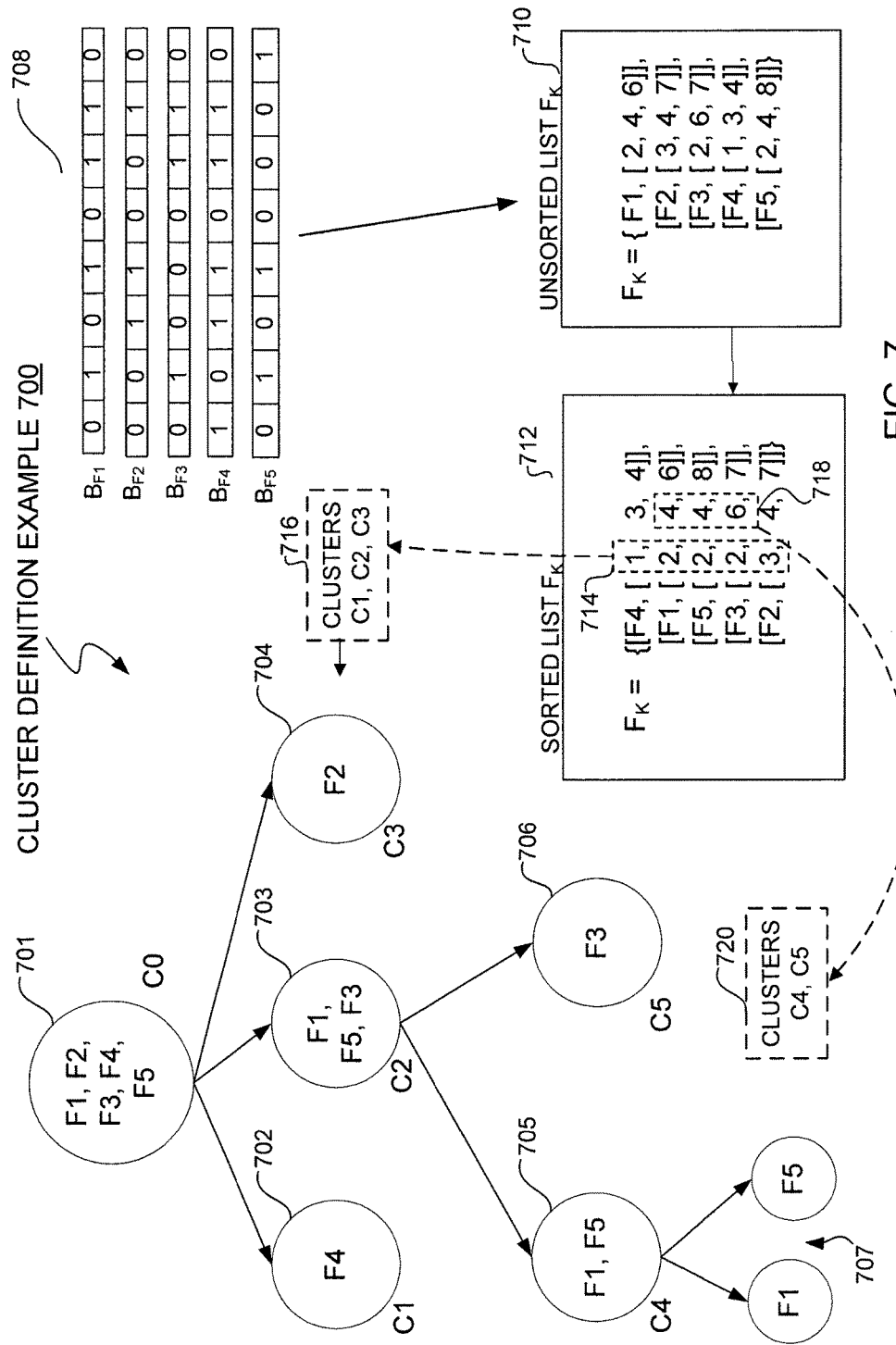
FIG. 7 is a block diagram illustrating an exemplary cluster definition for clustering files in a storage system according to one embodiment of the invention.

FIG. 7 is a block diagram illustrating another example of a cluster 700 of files F1, F2, F3, F4 and F5 that has been generated using an approximated "optimal" cluster definition using the cluster definition module/logic 124 of FIGS. 1 and 3, and related processes described in FIGS. 4-6. More specifically, cluster 700 is an example of a approximated "optimal" dendrogram for a file system with files {F1, F2, F3, F4, F5} having a super node C0 701 for all files [F1, F2, F3, F4, F5] and cluster node C1 702 containing file F4, cluster node C2 703 containing files F1, F5, F3, cluster node C3 704 containing files F2, cluster node C4 705 containing files [F1, F5] and cluster node C5 706 containing file F3 with the remaining nodes (unspecified) for files F1 and F5 at 707.

In the illustrated embodiment, the bitmaps $B_{F1}$, $B_{F2}$, $B_{F3}$, $B_{F4}$ and $B_{F5}$ 708 are processed to find the K smallest offsets listed in unsorted list $F_K$ 710. As illustrated F4 has a K smallest offset at offset 1, F1, F5 and F3 share a K smallest offset at offset 2, and F2 has a K smallest offset at offset 3. The sorted list $F_K$ 712 co-locates each of the files F1, F2, F3 F4 and F5 in order by their corresponding K minimum offset numbers $[O_1, O_2, O_3]$ 714 and are assigned to cluster C1, C2, C3 716 as follows: At the first level of dendrogram (note that the super node is considered at level-0), the files with the same $O_1$ value are assigned to the same cluster. Therefore, F4 is assigned to cluster C1 ($O_1=1$), F1, F5 and F3 are assigned to cluster C2 ($O_1=2$) and F3 is assigned to cluster C3 ($O_1=3$).

In the illustrated embodiment, since cluster C2 has more than one file, the files can be further clustered at the next level (level-2) into clusters C4, C5 at 720 as follows: At this level, files with the same value for $O_2$ are assigned to the same cluster. Therefore, F1 and F5 are assigned to cluster C4 ($O_2=4$) at 705 and F3 is assigned to a separate cluster C5 ($O_2=6$) at 706. In this manner, cluster 700 with 3 levels of hierarchy is generated from the complete cluster definition $F_K$ 712 containing a set of sorted lists of offset locations for the three (K=3) smallest offset locations contained in the bitmaps $B_F$ 708 for files F1, F2, F3, F4 and F5.

The foregoing processes 400/500/600 for the cluster definition module/logic 124 for generating an approximate "optimum" cluster definition advantageously facilitates efficient generation and use of storage clusters in a file system with deduplication and stream segmentation. Files that compress better together stay in the same clusters and optimize the capacity utilization of a file system with deduplication and stream segmentation. For example, the approximated optimal cluster definitions allow placing together files that compress well inside the same deduplication/compression domains because they can be collocated in the same partitions or same nodes in order to optimize physical space utilization.

In the foregoing description note that some or all of the components as shown and described above, such as the cluster definition module 124 in FIGS. 1 and 3 and associated logic as described in FIGS. 4-6 may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
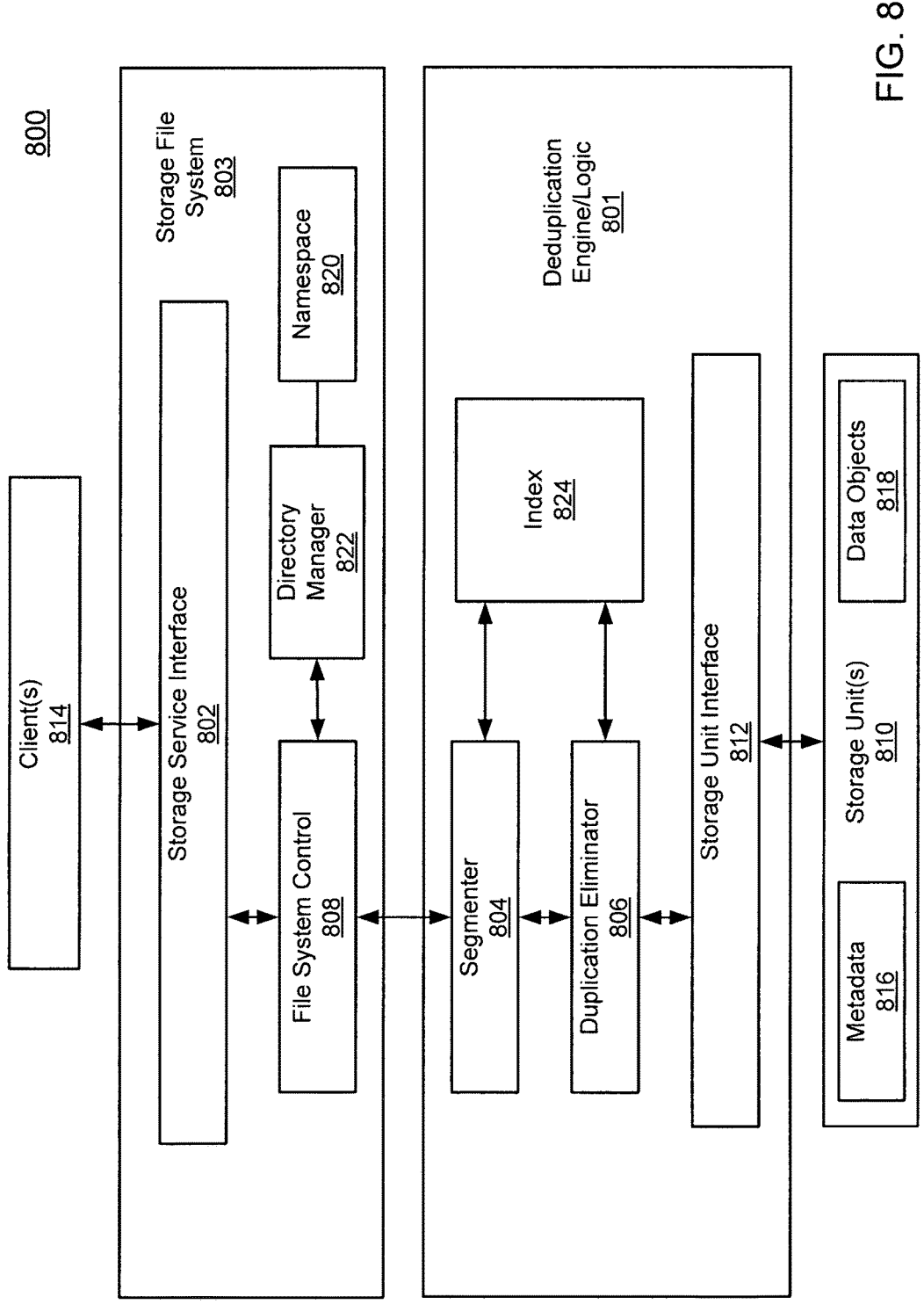
FIG. 8 is a block diagram illustrating a deduplication storage system in which files can be clustered according to one embodiment of the invention.

FIG. 8 is a block diagram illustrating a deduplication storage system according to one embodiment of the invention. For example, deduplication storage system 800 is implemented as part of the storage system 800 as described above, such as, for example, the deduplication storage system as a client and/or a server described above. In one embodiment, storage system 800 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 800 may have a distributed architecture, or all of its components may be integrated into a single unit. Storage system 800 may be implemented as part of an archive and/or backup system, or a disaster recovery system, such as a deduplicating storage system available from EMC® Corporation of Hopkinton, Mass.

In one embodiment, storage system 800 includes deduplication logic 801 interfacing one or more clients 814, via file system 803, with one or more storage units 810 storing metadata 816 and data objects 818. Clients 814 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 810 may be implemented locally (e.g., single node operating environment) or remotely (e.g., multi-node operating environment) via an interconnect, which may be a bus and/or a network (e.g., a storage network). In one embodiment, one of storage units 810 operates as an active storage to receive and store external or fresh user data from a client (e.g., an end-user client or a primary storage system associated with one or more end-user clients), while the another one of storage units 810 operates as a target storage unit to periodically archive data from the active storage unit according to an archiving policy or scheme.

Storage units 810 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 810 may also be combinations of such devices. In the case of disk storage media, the storage units 810 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 816, may be stored in at least some of storage units 810, such that files can be accessed independent of another storage unit. Metadata of each storage unit includes enough information to provide access to the files it contains. In one embodiment, metadata may include fingerprints or representatives contained within data objects 818, where a data object may represent a data segment (also referred to as a data chunk), a compression region (CR) of one or more data segments, or a container of one or more CRs. Fingerprints are mapped to a particular data object via metadata 816, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 816 may include a file name, a storage unit identifier (ID) identifying a storage unit in which the segments associated with the file name are stored, reconstruction information for the file using the segments, and any other appropriate metadata information. Metadata 816 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 803 includes file service interface 802, file system control logic 808, directory manager 822, and namespace 820. Deduplication logic 801 includes segmenter 804 (also referred to as a segmenting module or unit), duplication eliminator 806, and storage unit interface 812. File system control 808 receives a file or files (or data item(s)) via file service interface 802, which may be part of a file system namespace 820 of file system 803 associated with the deduplication logic 801. The file system namespace 820 refers to the way files are identified and organized in the system. An example is to organize the files hierarchically into directories or folders, which may be managed by directory manager 822. File service interface 812 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 804 and file system control 808. Segmenter 804, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 808, also referred to as a file system manager, processes information to indicate the segment(s) association with a file. In some embodiments, a list of fingerprints is used to indicate segment(s) associated with a file. File system control 808 passes segment association information (e.g., representative data such as a fingerprint) to index 824. Index 824 is used to locate stored segments in storage units 810 via storage unit interface 812. In one embodiment, index 824 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 824 maps a fingerprint of a segment to a container identifier identifying a container that contains the corresponding segment.

In one embodiment, index 824 includes a persistent hash-table of segment-IDs keyed either by the digest of the data stored in the segment or by the deduplication key of the data stored in the segment. The index 824 need not contain entries for every data segment in the deduplication domain, but the effectiveness of deduplication is a function of the number of entries stored in the index 824. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 824) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 806, also referred to as a segment store, identifies whether a newly received segment has already been stored in storage units 810. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 810 that make up the file. Segments are then packed by a container manager (which may be implemented as part of storage unit interface 812) into one or more storage containers stored in storage units 810. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 802 is configured to communicate with file system control 808 to identify appropriate segments stored in storage units 810 via storage unit interface 812. Storage unit interface 812 may be implemented as part of a container manager. File system control 808 communicates (e.g., via segmenter 804) with index 824 to locate appropriate segments stored in storage units via storage unit interface 812. Appropriate segments are retrieved from the associated containers via the container manager and are used to construct the requested file. The file is provided via interface 802 in response to the request. In one embodiment, file system control 808 utilizes a tree (e.g., a segment tree obtained from namespace 820) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 800 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 801) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
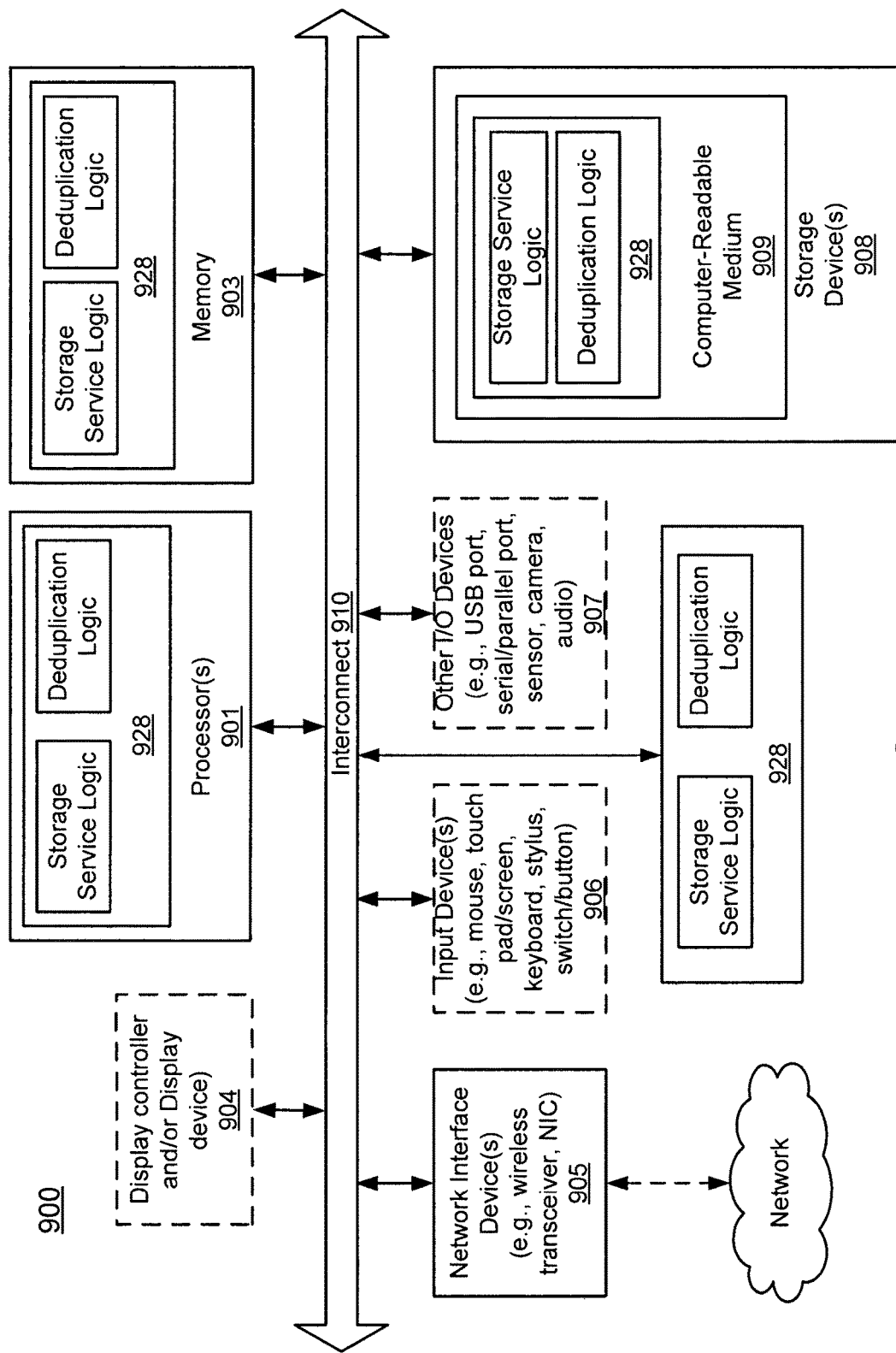
FIG. 9 is a block diagram illustrating a data processing system in which files can be clustered according to one embodiment of the invention.

FIG. 9 is a block diagram illustrating an example of a data processing system that may be used with one embodiment of the invention. For example, system 900 may represents any of data processing systems described above performing any of the processes or methods described above. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 900 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Module/unit/logic 928 may also reside, completely or at least partially, within memory 903 and/or within processor 901 during execution thereof by data processing system 900, memory 903 and processor 901 also constituting machine-accessible storage media. Module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 928, components and other features described herein can be implemented as discrete hardware components or integrated in the functionality of hardware components such as ASICS, FPGAs, DSPs or similar devices. In addition, module/unit/logic 928 can be implemented as firmware or functional circuitry within hardware devices. Further, module/unit/logic 928 can be implemented in any combination hardware devices and software components.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for clustering files in a storage system with deduplication to optimize storage capacity utilization of the storage system, the method comprising:
    for each file in a plurality of files, estimating similarity of files based on whether files share content, including:
        obtaining a bitmap vector of offsets having a binary value of one or zero, each binary value of one representing a segment belonging to the file, the segment having a unique portion of content belonging to any or none of the plurality of files,
        finding any one or more smallest offsets in the bitmap vector having the binary value of one, the smallest offsets found in leftmost positions of offsets in the bitmap vector, and
        assembling the found offsets into a list of offset numbers indicating in which of the leftmost positions the found offsets are located, the similarity of files based on files listing any one or more of the same offset numbers sharing content;
    accumulating the lists of offset numbers assembled for each file in the plurality of files into a cluster definition, the cluster definition approximating an optimal data structure for clustering files that share content in clusters hierarchically arranged based on the offset numbers;
    sorting the accumulated lists of offset numbers for each file in the plurality of files in a significant number order;
    assigning all files sorting to a same offset number in the significant number order to a same cluster in the hierarchically arranged clusters; and
    placing at least some of the plurality of files in a same domain, partition, or storage node of the storage system based on the cluster definition for compression or deduplication together.

2. The method of claim 1, further comprising:
    adjusting how many of the smallest offsets in the bitmap vector are found, a fewer number of smallest offsets defining clusters of files that share content with less granularity and a greater number of smallest offsets defining clusters of files that share content with more granularity.

3. The computer-implemented method of claim 1, further comprising generating the bitmap vector using a bloom filter, the generating including:
    traversing segments belonging to the file;
    sampling a subset of the segments traversed; and
    inserting each sampled segment into the bitmap vector using the bloom filter.

4. The computer-implemented method of claim 3, wherein sampling is based on a content-based sampling pattern.

5. The computer-implemented method of claim 3, wherein sampling is performed on one of every R segments belonging to the file.

6. The computer-implemented method of claim 3, wherein the bloom filter has a single hash function that uniformly distributes the offsets having the binary value of one or zero across the bitmap vector.

7. The computer-implemented method of claim 1, wherein the content shared by the files listing any one or more of the same offset numbers is the same one or more segments that the found offsets represent.

8. The computer-implemented method of claim 7, wherein the similarity of files listing more of the same offset numbers is estimated to be greater than the similarity of files listing less of the same offset numbers.

9. A non-transitory computer-readable storage medium having instructions stored therein, which when executed by a processor, cause the processor to perform operations for clustering files in a storage system with deduplication to optimize storage capacity utilization of the storage system, the operations comprising:
    for each file in a plurality of files, estimating similarity of files based on whether files share content, including:
        obtaining a bitmap vector of offsets having a binary value of one or zero, each binary value of one representing a segment belonging to the file, the segment having a unique portion of content belonging to any or none of the plurality of files,
        finding any one or more smallest offsets in the bitmap vector having the binary value of one, the smallest offsets found in leftmost positions of offsets in the bitmap vector, and
        assembling the found offsets into a list of offset numbers indicating in which of the leftmost positions the found offsets are located, the similarity of files based on files listing any one or more of the same offset numbers sharing content;
    accumulating the lists of offset numbers assembled for each file in the plurality of files into a cluster definition, the cluster definition approximating an optimal data structure for clustering files that share content in clusters hierarchically arranged based on the offset numbers;
    sorting the accumulated lists of offset numbers for each file in the plurality of files in a significant number order;
    assigning all files sorting to a same offset number in the significant number order to a same cluster in the hierarchically arranged clusters; and placing at least some of the plurality of files in a same domain, partition, or storage node of the storage system based on the cluster definition for compression or deduplication together.

10. The non-transitory computer-readable storage medium of claim 9, wherein the operations further comprise:
adjusting how many of the smallest offsets in the bitmap vector are found, a fewer number of smallest offsets defining clusters of files that share content with less granularity and a greater number of smallest offsets defining clusters of files that share content with more granularity.

11. The non-transitory computer-readable storage medium of claim 9, wherein the operations further comprise generating the bitmap vector using a bloom filter, the generating including:
traversing segments belonging to the file;
sampling a subset of the segments traversed; and
inserting each sampled segment into the bitmap vector using the bloom filter.

12. The non-transitory computer-readable storage medium of claim 11, wherein sampling is based on a content-based sampling pattern.

13. The non-transitory computer-readable storage medium of claim 11, wherein sampling is performed on one of every R segments belonging to the file.

14. The non-transitory computer-readable storage medium of claim 11, wherein the bloom filter has a single hash function that uniformly distributes the offsets having the binary value of one or zero across the bitmap vector.

15. The non-transitory computer-readable storage medium of claim 9, wherein the content shared by the files listing any one or more of the same offset numbers is the same one or more segments that the found offsets represent.

16. The non-transitory computer-readable storage medium of claim 15, wherein the similarity of files listing more of the same offset numbers is estimated to be greater than the similarity of files listing less of the same offset numbers.

17. A data processing system, comprising:
a memory in which to store:
a bitmap for each file in a plurality of files, the bitmaps containing offsets having a binary value of one or zero, each binary value of one representing a segment belonging to the file, the segment having a unique portion of content belonging to any or none of the plurality of files;
a processor in communication with the memory, the processor configured to estimate similarity of files in the plurality of files, including:
find any one or more smallest offsets in each bitmap having the binary value of one, the smallest offsets found in leftmost positions of offsets in the bitmap, and
assemble the found offsets into a list of offset numbers indicating in which of the leftmost positions the found offsets are located and the file for which they were found, the similarity of files based on files listing any one or more of the same offset numbers sharing content;

the processor further configured to accumulate the lists of offset numbers assembled for each file in the plurality of files into a cluster definition, the cluster definition approximating an optimal data structure for clustering files that share content in clusters hierarchically arranged based on the offset numbers;
the processor further configured to sort the accumulated lists of offset numbers for each file in the plurality of files in a significant number order;
the processor further configured to assign all files sorting to a same offset number in the significant number order to a same cluster in the hierarchically arranged clusters; and
the processor further configured to optimize storage capacity utilization of the data processing system, comprising placing at least some of the plurality of files in a same domain, partition, or storage node of the data processing system based on the cluster definition for compression or deduplication together.

18. The data processing system of claim 17, wherein the processor is further configured to:
receive an input parameter to adjust how many of the smallest offsets in the bitmap are found, a fewer number of smallest offsets defining clusters of files that share content with less granularity and a greater number of smallest offsets defining clusters of files that share content with more granularity.

19. The data processing system of claim 17, wherein the processor is further configured to:
generate the bitmap using a bloom filter, the generating including:
traverse segments belonging to the file;
sample a subset of the segments traversed; and
insert each sampled segment into the bitmap using the bloom filter.

20. The data processing system of claim 19, wherein the processor is further configured to:
receive an input parameter specifying a content-based sampling pattern; and
to sample the subset of the segments based on the content-based sampling pattern.

21. The data processing system of claim 19, wherein the processor is further configured to sample one of every R segments belonging to the file.

22. The data processing system of claim 19, wherein the processor is further configured to generate the bloom filter with a single hash function that uniformly distributes the offsets having the binary value of one or zero across the bitmap.

23. The data processing system of claim 17, wherein the content shared by the files listing any one or more of the same offset numbers is the same one or more segments that the found offsets represent.

24. The data processing system of claim 17, wherein the similarity of files listing more of the same offset numbers is estimated to be greater than the similarity of files listing less of the same offset numbers.

* * * * *